Figure 1:
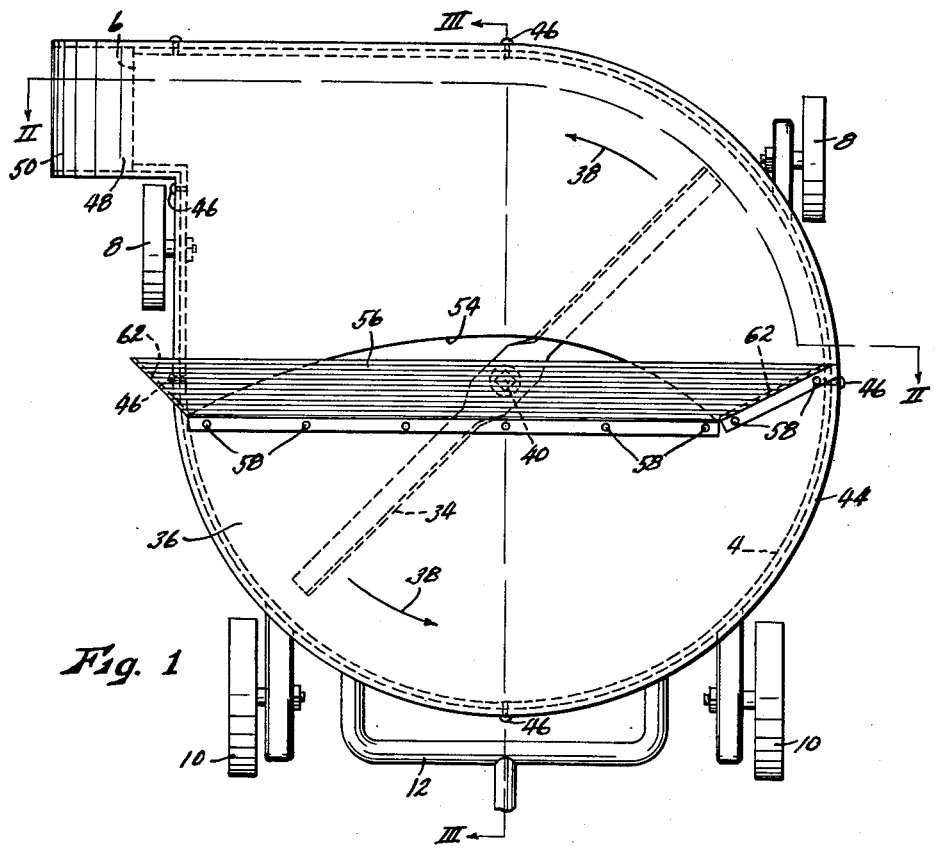

Aug. 4, 1964    J. C. JACOB    3,142,913
SNOW PLOW ATTACHMENT FOR LAWN MOWERS
Filed April 2, 1962    2 Sheets-Sheet 1

INVENTOR.
John C. Jacob
BY John A. Hamilton
Attorney.

Aug. 4, 1964 　　　J. C. JACOB　　　3,142,913
SNOW PLOW ATTACHMENT FOR LAWN MOWERS
Filed April 2, 1962　　　　　　　　　　　　　2 Sheets-Sheet 2

INVENTOR.
John C. Jacob
BY John A. Hamilton
Attorney.

United States Patent Office 3,142,913
Patented Aug. 4, 1964

3,142,913
SNOW PLOW ATTACHMENT FOR LAWN MOWERS
John C. Jacob, 5001 Metropolitan Ave.,
Kansas City, Kans.
Filed Apr. 2, 1962, Ser. No. 184,059
3 Claims. (Cl. 37—43)

This invention relates to new and useful improvements in snow plows or snow removal devices, and has as its principal object the provision of an attachment whereby an ordinary rotary lawn mower may be converted for use as a snow plow.

Another object is the provision of a device for converting a lawn mower for use as a snow plow with a minimum of alteration and adaptation and in a very simple and convenient manner, involving only the substitution of an impellor blade for the usual cutter blade of the mower, and the addition of a pan or plate covering the lower face of the mower base, said pan having a central aperture formed therein. The pan is provided with a scoop adjacent the aperture and depending to a point closely adjacent the surface from which snow is to be removed, said scoop serving to elevate snow through the aperture as the device is moved forwardly. Also, the impellor blade creates a strong updraft of air through the aperture, which assists in elevating snow through said aperture into the space between the mower base and the pan. The snow is ejected from this space by the impellor blade through a side opening provided therein, which may be the opening provided for grass cuttings when the device is operating as a lawn mower. The pan provides an upwardly directed extension of this opening, whereby the snow ejected therethrough is thrown upwardly and transversely to the line of travel of the device.

Other objects are simplicity and economy of construction, efficiency and dependability of operation, and adaptability of the attachment for use with many types of pre-existing lawn mowers.

Figure 2:
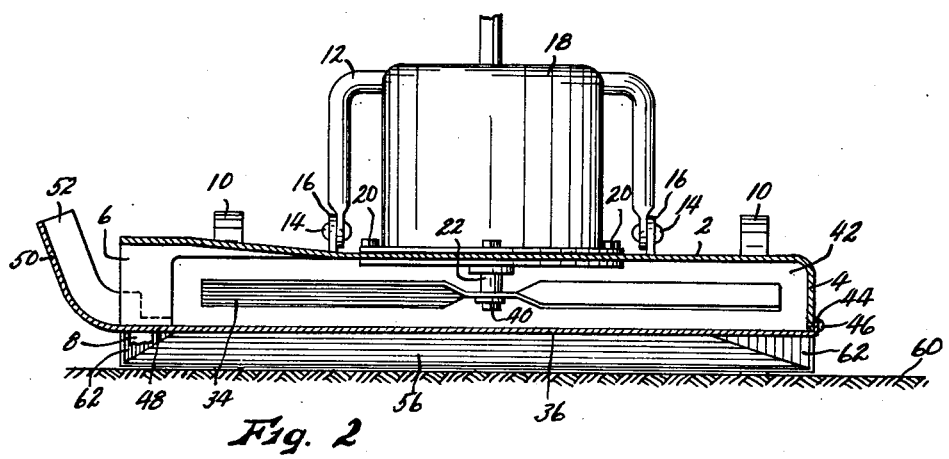
Figure 3:
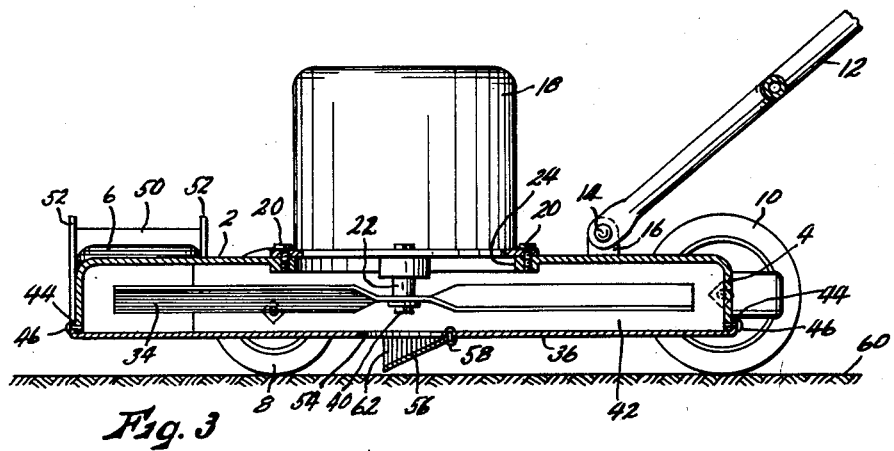
Figure 4:
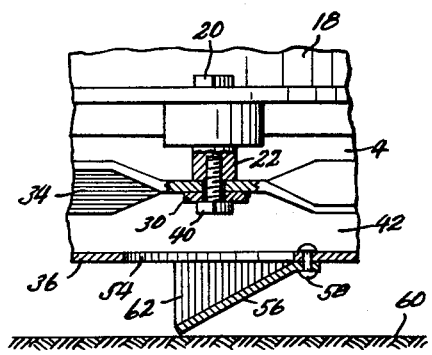
Figure 5:
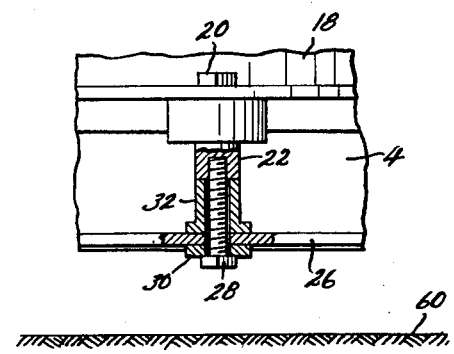

With these objects in view, as well as other objects which will appear in the course of the specification, reference will be had to the drawing, wherein:

FIG. 1 is an inverted plan view of a rotary lawn mower with parts broken away, and with a snow plow attachment embodying the present invention applied thereto, FIG. 2 is a sectional view taken on line II—II of FIG. 1, with parts broken away, FIG. 3 is a sectional view taken on line III—III of FIG. 1, with parts left in elevation, FIG. 4 is an enlarged fragmentary view similar to FIG. 3, showing details of the impellor blade mounting, and FIG. 5 is a view similar to FIG. 4, with the usual lawn mower cutter blade substituted for the impellor blade.

Like reference numerals apply to similar parts throughout the several views, and the numeral 2 applies to the base or platform of an ordinary rotary lawn mower. Said base is generally of inverted dish shape, having its edge portion 4 turned downwardly, and is open at the bottom. Said base and edge portion also define a laterally opening tunnel 6, also open at the bottom and usually disposed at the front of the base, through which grass cuttings are expelled in the normal operation of the mower. Base 2 is supported horizontally above the ground by a pair of front wheels 8 and a pair of rear wheels 10 mounted rotatably therein. The base may be propelled manually over the ground by means of a handle 12 pivoted at 14 to lugs 16 affixed to the top of the base, and extending upwardly and rearwardly therefrom. A prime mover 18 such as an electric motor or gasoline engine is mounted centrally on the upper surface of base 2, as by screws 20. The power output shaft 22 of said prime mover is disposed vertically, and extends downwardly through an aperture 24 in said base. When the device is to be used as a lawn mower, a cutter blade 26 is attached to the lower end of the shaft as shown in FIG. 5. It will be understood that the blade is horizontal and attached at its mid-point to the shaft, and that its outer end portions, not shown, are provided with cutting edges extending radially to shaft 22, whereby as said blade is rotated by motor or engine 18 and the device is propelled over the ground, blade 26 cuts the grass and expels it through tunnel 6.

As shown in FIG. 5, cutter blade 26 is usually attached to shaft 22 by a vertical headed screw 28 which extends successively through a washer 30, blade 26, tubular shaft extension 32, and is finally threaded axially into shaft 22. The length of extension 32 is such that blade 26 is disposed at or very slightly above the lower edge of skirt 4 of the base, which is desirable for efficient mowing. The purpose of the extension is that if the blade should strike a solid obstruction such as a rock, and thus impose a severe bending stress on the shaft, the damage will in most cases be confined to the extension and the screw 28, both of which may easily be replaced, while replacement of drive shaft 22 itself would require a major overhaul.

Conversion of the lawn mower thus far described for use as a snow plow, according to the present invention, requires only the substitution of an impellor or blower blade 34 for cutter blade 26, and the addition of a pan or plate 36 covering the bottom of base 2 at the level of the lower edge of skirt 4 thereof.

Impeller blade 34 is in the nature of a fan blade, having its end portions inclined to create an updraft of air as it is rotated in the direction of the arrows 38 in FIG. 1, and being secured at its midpoint to drive shaft 22 by a screw 40 (best shown in FIG. 4) which extends through washer 30 and impellor blade 34, and is threaded directly into shaft 22. Shaft extension 32, previously described for use with cutter blade 26, is eliminated. This provides that the impellor blade is disposed substantially higher than the cutter blade, preferably about midway between base 2 and pan 36, in order that it may function more efficiently as a blower in the chamber 42 between said base and said pan.

Pan 36 is formed of sheet metal and is substantially horizontal, engaging the lower edge of skirt 4 of the base around the periphery thereof. Said pan is provided at its edge with an upturned lip 44 which engages the outer face of the skirt, and which is releaseably secured to said skirt by any suitable means such as screws 46. The pan is also provided with a lateral extension 48 (see FIGS. 1 and 2) which forms a bottom wall for tunnel 6, and extends outwardly beyond the outer end of said tunnel. The outwardly extending portion thereof is turned upwardly to form an upwardly directed spout 50, said spout being provided with side walls 52. The pan has an aperture 54 formed therein directly beneath drive shaft 22. Said aperture is elongated transversely to the line of travel of the device, extending all the way to the side of the base at which tunnel 6 is disposed, and at which the impellor blade 34 travels rearwardly, but terminating in inwardly spaced relation from the opposite side of the base, at which the impellor blade travels forwardly. The forward edge of the aperture is concavely curved, while the rearward edge thereof is straight. A scoop 56, also formed of sheet metal, is secured to pan 36 along the rearward edge of aperture 54, as by rivets 58, and is inclined downwardly and forwardly to a point closely adjacent the ground surface 60 on which wheels 8 and 10 rest, and from which snow is to be removed. Scoop 56 extends the full width of base 2 and in addition to the full lateral width of front wheels 8, if either of these wheels are spaced laterally outwardly from the base, as is the left hand wheel 8 as shown in FIG. 1. The scoop is also provided with vertical end walls 62 which converge rearwardly from the relatively wide forward edge of the scoop to the relatively restricted width of aperture 54.

In operation as a snow plow, motor or engine 18 is set in operation, and the device propelled forwardly on wheels 8 and 10 by means of handle 12. Scoop 56, being disposed close to ground surface 60, picks up snow and directs it upwardly through aperture 54 into chamber 42. End walls 62 of the scoop permit a path the full width of the base to be cleared despite the relatively restricted width of aperture 54, by directing snow from the extreme sides of the path inwardly to the aperture. Passage of the snow upwardly through aperture 54 is also assisted by the strong updraft of air through the aperture created by the impellor blade, whereby the device operates also as a "vacuum cleaner." This draft also eliminates any tendency of the snow to be pushed forwardly and packed ahead of the scoop. Snow entering chamber 42 is both blown and mechanically driven outwardly through tunnel 6 and deflected upwardly by spout 50, so as to be deposited to one side of the path of travel of the device. Aperture 54 may extend to the left side of the base, as viewed in FIG. 1, since the impellor blade is travelling rearwardly at this position, and has just discharged its load of snow through tunnel 6 and spout 50. Also, any snow still carried by the blade at this position will be retained in chamber 42 by scoop 56. However, at the right side of the base the blade is travelling forwardly, and is heavily laden with snow, and hence would tend to discharge snow outwardly through aperture 54 were not said aperture terminated in spaced relation from this side of the base. Since centrifugal force causes the snow to move to the outer periphery of the base, against skirt 4, the major portion of the snow is always carried at the outer end portions of the impellor blade.

As has been previously described, omission of extension 32 of drive shaft 22, when converting from mower to snow plow operation, automatically elevates impellor blade 34 to the position desired. However, if the mower is one which does not use a driveshaft extension, but has a full length one-piece shaft, my attachment may still be used by providing an impellor blade with its end portions offset upwardly from its central portion which is affixed to the shaft. If the central portion thereof, or screw 40, then extends below the level of pan 36, they will be accommodated in aperture 54 of the pan.

It is readily observable that conversion of the mower to snow plow operation, or back to mower operation, is a very simple operation requiring only common household tools. The attachment itself is very simple and economical. It may be adapted for use with many different designs of mowers, simply by shaping the pan to the contour of the base of each mower.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. In combination with a rotary lawn mower consisting of a wheeled, generally horizontal base having a downturned skirt around its edges, said base and skirt defining an outlet tunnel extending laterally to the line of travel of said base at one side thereof, said base and tunnel being open at the bottom, and a prime mower mounted on the top of said base and having a vertical power output shaft extending downwardly through said base, a snow plow attachment comprising:

(a) a generally planar, horizontal pan affixed to said base to close the bottom thereof at the level of the lower edge of said skirt, whereby to form a chamber between said base and said pan, said pan having a restricted aperture formed therein which is elongated transversely of the base, said aperture extending substantially to the side of the base at which said tunnel is disposed but terminating in spaced relation from the opposite side of the base, and (b) an impeller blade affixed to said shaft within said chamber and operable to draw air and snow into said chamber through said pan aperture and to discharge them from said chamber through said tunnel, said impeller blade including sections extending radially from said shaft and inclined to their plane of rotation, said blade being rotated so as to move rearwardly at the side of the base at which said tunnel is disposed, and forwardly at the opposite side of the base.

2. The structure as defined in claim 1 with the addition of:

(a) a scoop affixed to said pan adjacent the rearward edge of the aperture therein, and inclined forwardly and downwardly therefrom to a point closely adjacent to the support plane of said wheeled base.

3. The structure as defined in claim 2 wherein the forward edge of said scoop is at least as wide as said base and said aperture is narrower than said base, and wherein said scoop is provided with:

(a) vertical end walls converging rearwardly from the lateral ends of the forward edge of said scoop to the lateral ends of said aperture.

References Cited in the file of this patent

UNITED STATES PATENTS

| | | |
|---|---|---|
| 2,718,739 | Long | Sept. 27, 1955 |
| 2,930,068 | Evanson et al. | Mar. 29, 1960 |
| 3,035,359 | Ewert | May 22, 1962 |
| 3,043,036 | Trojanek | July 10, 1962 |
| 3,064,369 | Wildes | Nov. 20, 1962 |